(12) United States Patent
Sakura et al.

(10) Patent No.: US 8,221,275 B2
(45) Date of Patent: *Jul. 17, 2012

(54) CHAIN TRANSMISSION DEVICE

(75) Inventors: Shunji Sakura, Osaka (JP); Masatoshi Sonoda, Osaka (JP)

(73) Assignee: Tsubakimoto Chain Co., Osaka (JP)

(*) Notice: Subject to any disclaimer, the term of this patent is extended or adjusted under 35 U.S.C. 154(b) by 610 days.

This patent is subject to a terminal disclaimer.

(21) Appl. No.: 12/393,506

(22) Filed: Feb. 26, 2009

(65) Prior Publication Data

US 2009/0247337 A1    Oct. 1, 2009

(30) Foreign Application Priority Data

Mar. 31, 2008 (JP) ................ 2008-090505

(51) Int. Cl.
*F16H 7/06* (2006.01)
(52) U.S. Cl. ......... 474/157; 474/164; 474/213; 474/231
(58) Field of Classification Search .......... 474/152, 474/153, 155, 156, 157, 164, 202, 206, 212, 474/213, 226, 228, 230, 231
See application file for complete search history.

(56) References Cited

U.S. PATENT DOCUMENTS

| 4,832,668 A | * | 5/1989 | Ledvina et al. | 474/155 |
| 5,690,571 A | * | 11/1997 | Mott | 474/212 |
| 6,171,209 B1 | | 1/2001 | Matsuda | |
| 2007/0275804 A1 | | 11/2007 | Morimoto | |
| 2009/0247340 A1 | | 10/2009 | Sakura | |

FOREIGN PATENT DOCUMENTS

| JP | S57-96835 | 12/1980 |
| JP | 59-30936 B2 | 3/1981 |
| JP | 2001-355684 | 12/2001 |

* cited by examiner

*Primary Examiner* — William E Dondero
(74) *Attorney, Agent, or Firm* — Howson & Howson LLP (57) ABSTRACT

In a chain transmission using a hybrid chain having inner and outer links with bushings, or with bushings and rollers, the rollers mesh with a central sprocket, and the link plates have teeth that function as a silent chain, meshing with side sprockets fixed to the central sprocket. The teeth of the link plates of the inner links have a shape different from that of the teeth of the link plates of the outer links. The outer flanks of the teeth can all have the same shape, and the shape difference can be in the shapes of the inner flanks.

8 Claims, 13 Drawing Sheets

CHAIN TRANSMISSION DEVICE

CROSS-REFERENCE TO RELATED APPLICATION

This application claims priority on the basis of Japanese patent application 2008-090505, filed Mar. 31, 2008. The disclosure of Japanese application 2008-090505 is hereby incorporated by reference.

FIELD OF THE INVENTION

The invention relates to a chain transmission in which a chain is wound around sprockets to transmit power. A typical application of a chain transmission is the transmission of power to auxiliary equipment such as an oil pump in an engine, or the transmission of power from an engine crankshaft to the camshafts that operate the engine's intake and exhaust valves.

BACKGROUND OF THE INVENTION

In chain transmissions, it is common to use a roller chain, a rollerless bushing chain, or a silent chain. Furthermore, hybrid chains in which the features of a silent chain and the features of a roller chain or bushing chain are combined have been used in chain transmissions in which the sprockets are provided with a set of teeth for meshing with rollers or bushings of the chain, and one or more sets of teeth for meshing with toothed link plates in the chain.

Figure 15:
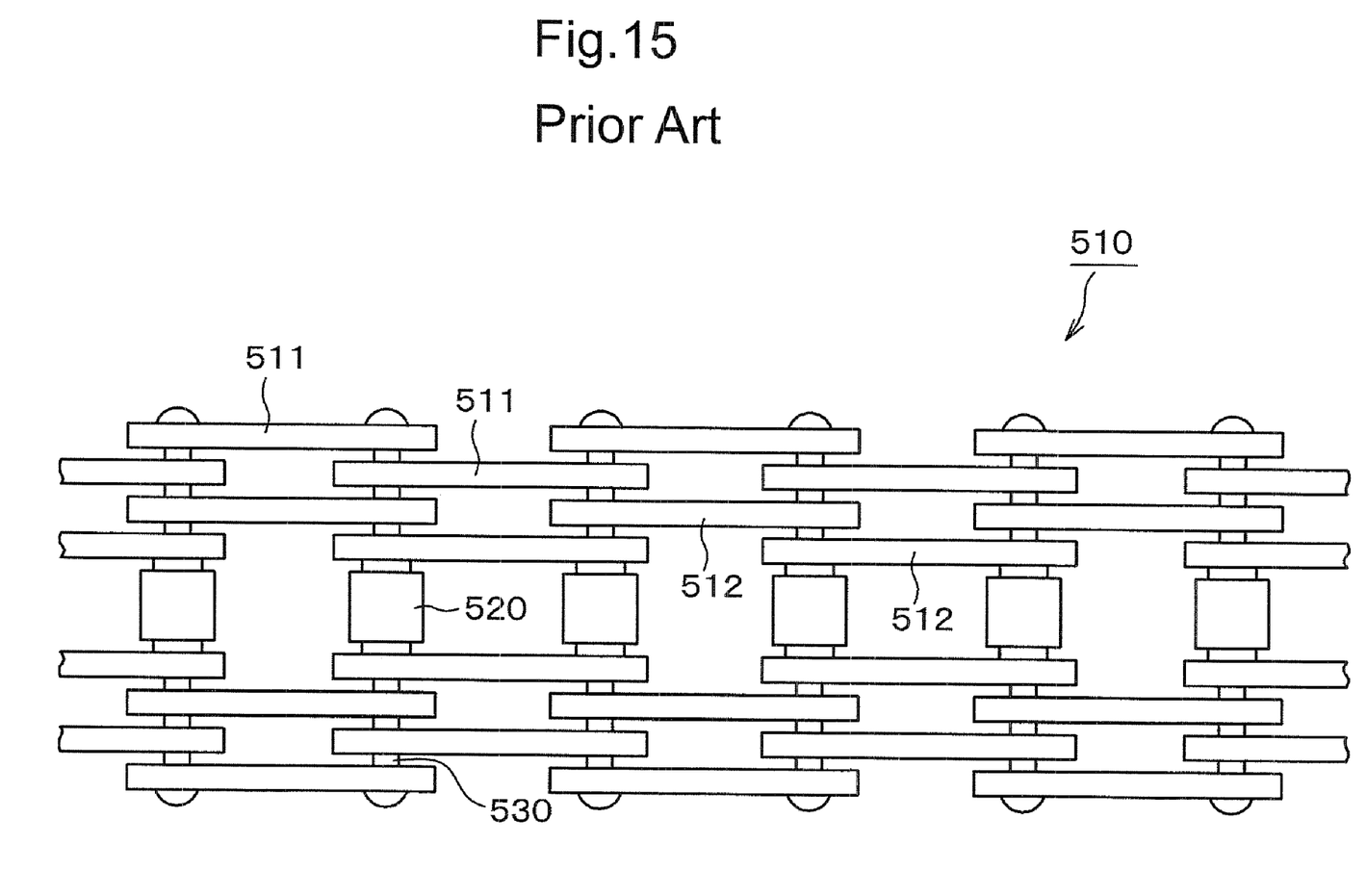
FIG. 15 is a plan view of a chain in a conventional chain transmission.
Figure 16:
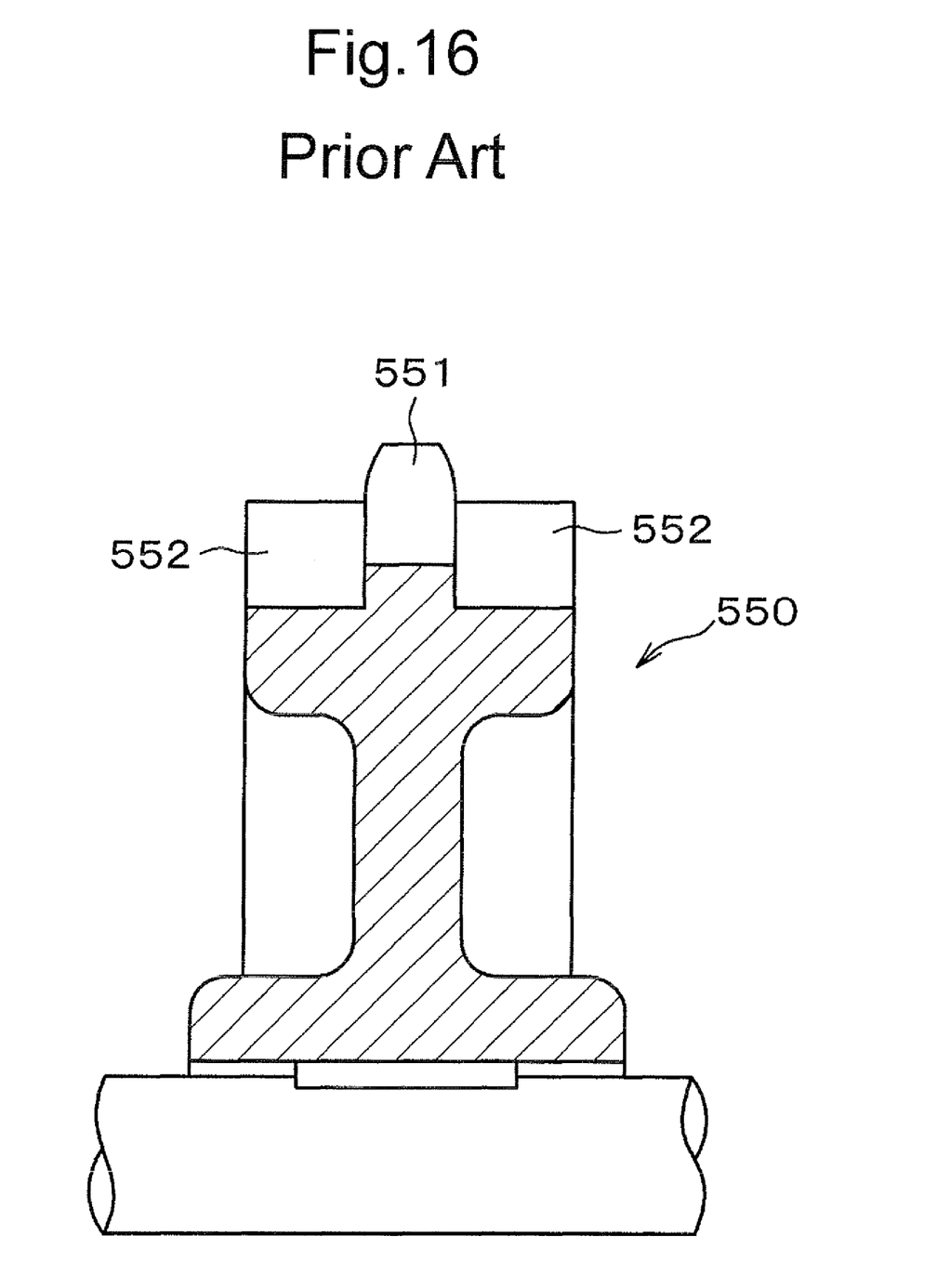
FIG. 16 is a cross-sectional view of a sprocket in a conventional chain transmission.

A typical chain transmission incorporating such a hybrid chain is shown in FIGS. 15 and 16. In FIG. 15, a chain 510 comprises link plates 511, which function as a silent chain. Link plates 511, each of which has a pair of teeth, are disposed along both sides of the chain in alternating, overlapping, relationship. Link plates 512, which do not have teeth, are disposed in alternating, overlapping, relationship along the inside of the chain, and cooperate with rollers 520 in such a way as to function as a roller chain. The link plates 511 and 512 are connected by connecting pins 530. A sprocket 550, shown in FIG. 16, has teeth 552, which cooperate with the teeth of plates 511, and teeth 551, which cooperate with the rollers 520.

In the operation of the chain transmission, teeth of the link plates 511, which function as a silent chain, engage sprocket teeth 552. When a tooth of a link plate 511 is seated on a sprocket tooth 552, a roller 520 engages a sprocket tooth 551. Further details of the chain transmission just described can be found in Japanese Examined Patent Publication No. Sho. 59-30936.

A chain transmission using a convention silent chain exhibits significant elongation due to wear of its connecting pins, and the elongation of the chain is accompanied by a reduction in its strength. In a chain transmission using a conventional roller chain, obtaining high strength is difficult, especially because of difficulties in strengthening the rollers. Furthermore, conventional roller chains produce a large amount of noise as they come into engagement with a sprocket.

In the hybrid chain describe above, in which the outer link plates function as a silent chain and transmit power, the problem of elongation due to wear of the connecting pins has not been overcome. Thus, as in the case of a conventional silent chain, elongation of the chain occurs, and is accompanied by a decrease in strength. Another problem with a transmission incorporating the conventional hybrid chain is that it generates noise due to vibration at a frequency corresponding to the number of sprocket teeth.

This invention addresses the above-described problems by providing a chain transmission in which engagement noise is reduced, and which avoids a decrease in chain strength due to elongation resulting from excessive wear of the connecting pins.

SUMMARY OF THE INVENTION

The chain transmission according to the invention comprises a chain, and a sprocket in mesh with the chain. The chain according to the invention comprises outer links and inner links in alternating, overlapping relationship. Each outer link comprises a pair of outer link plates in laterally spaced relationship, the outer link plates of each pair being connected by a pair of connecting pins secured respectively in front and rear pin holes in the pair of outer link plates. Each inner link comprising a pair of inner link plates in laterally spaced relationship, the inner link plates of each pair being connected by a pair of bushings secured respectively in front and rear bushing holes in the pair of inner link plates. Each connecting pin of each outer link extends through, and is rotatable in, a bushing of an overlapping inner link. Each of the outer link plates and each of the inner link plates are formed with front and rear link plate teeth. The sprocket has central sprocket teeth which engage with the bushings or with rollers rotatable on the bushings. The sprocket also has side sprocket teeth which engage with the link plate teeth. The teeth of the outer link plates have a shape different from that of the teeth of the inner link plates.

In an embodiment of the invention, the outer flanks of the teeth of the link plates have the same shape, but the inner flanks of the teeth of the outer link plates have a shape different from that of the inner flanks of the teeth of the inner link plates.

In another embodiment, the inner flank of the front link plate tooth of each link plate has a shape different from that of the inner flank of the rear link plate tooth of the same link plate.

Preferably, side sprocket teeth are provided on both sides of the central sprocket teeth, and in an embodiment of the invention, the link plate teeth which have different shapes depending on whether they are teeth of the outer or inner link plates, are provided on both upper and lower sides of the outer and inner link plates.

The hybrid chain exhibits reduced noise generation, as in the case of a conventional roller chain, and further prevents a reduction in the strength of the chain due to elongation resulting from to wear of the connecting pins. Furthermore, since the teeth of the outer link plates have a shape different from that of the teeth of the inner link plates, the timing of the engagement of the link plate teeth with the side sprocket teeth is shifted, and vibration and noise, at frequencies which correspond to the number of sprocket teeth, are significantly reduced.

When the outer flanks of the teeth of the inner and outer link plates have the same shape, but the inner flanks of the teeth of the outer link plates have a shape different from that of the inner flanks of the teeth of the inner link plates, the positioning of the chain on the sprocket is determined by seating of the outer flanks on the sprocket, and becomes the same for all the link plates. Therefore, power transmission is stabilized, while, at the same time, because the shapes of the inner flanks are different, the timing of the engagement of the link plate teeth with the side sprocket teeth is shifted, and vibration and noise, at frequencies which correspond to the number of sprocket teeth, are reduced.

When the inner flank of the front link plate tooth of each link plate has a shape different from that of the inner flank of the rear link plate tooth of the same link plate, the timing of disengagement of the link plate teeth from the side sprocket teeth is shifted, and a further reduction in vibration and noise, at frequencies which correspond to the number of sprocket teeth, can be realized.

When side sprocket teeth are provided on both sides of the central sprocket teeth, power is more uniformly transmitted to both sides of the chain, and a still further reduction in vibration and noise can be achieved.

When the link plate teeth are provided on both upper and lower sides of the outer and inner link plates, assembly of the chain is simplified because it is unnecessary to take into account the directions of the teeth of the plates. Moreover, the chain can be used with sprockets both on the inside, and on the outside, of the loop formed by the chain.

DETAILED DESCRIPTION OF THE PREFERRED EMBODIMENTS

In the chain transmission according to the invention, the chain construction is similar to that of a roller chain or rollerless bushing chain, in which outer links and inner links are connected in alternating sequence by pins that connect opposite plates of the outer links, and bushings that connect opposite plates of the inner links, and in which a pin of each outer link extends through a bushing of an adjacent inner link. The link plates are formed with front and rear teeth similar to those of a conventional silent chain. The rollers or bushings mesh with central teeth on a sprocket, and the teeth formed on link plates mesh with side sprocket teeth, preferably on both sides of the central teeth. The chain of the invention is characterized by the fact that the link plate teeth of the outer link plates have a shape different from that of the link plate teeth of the inner links.

Figure 1:
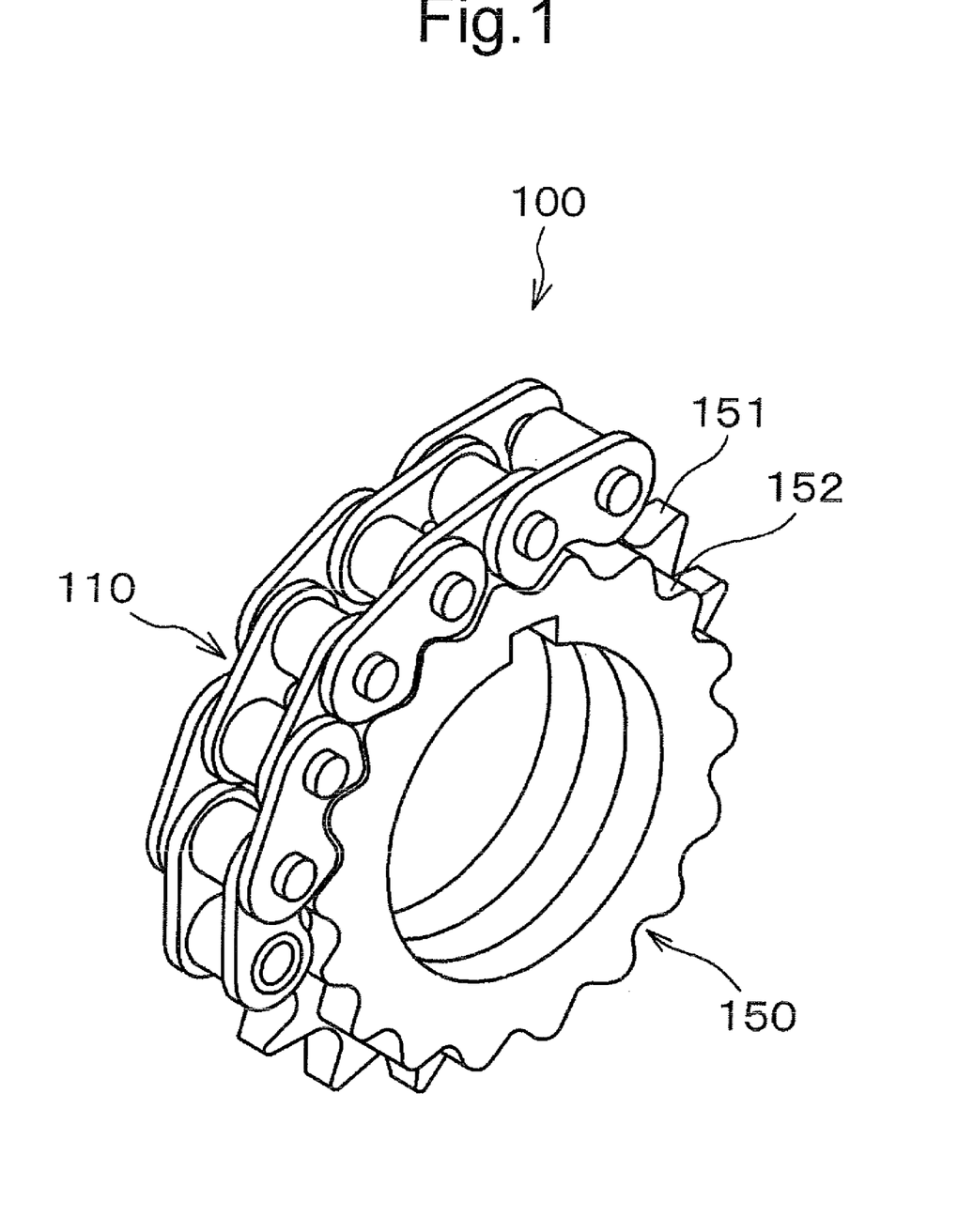
FIG. 1 is a perspective view of a part of a chain transmission in accordance with the invention.
Figure 2:
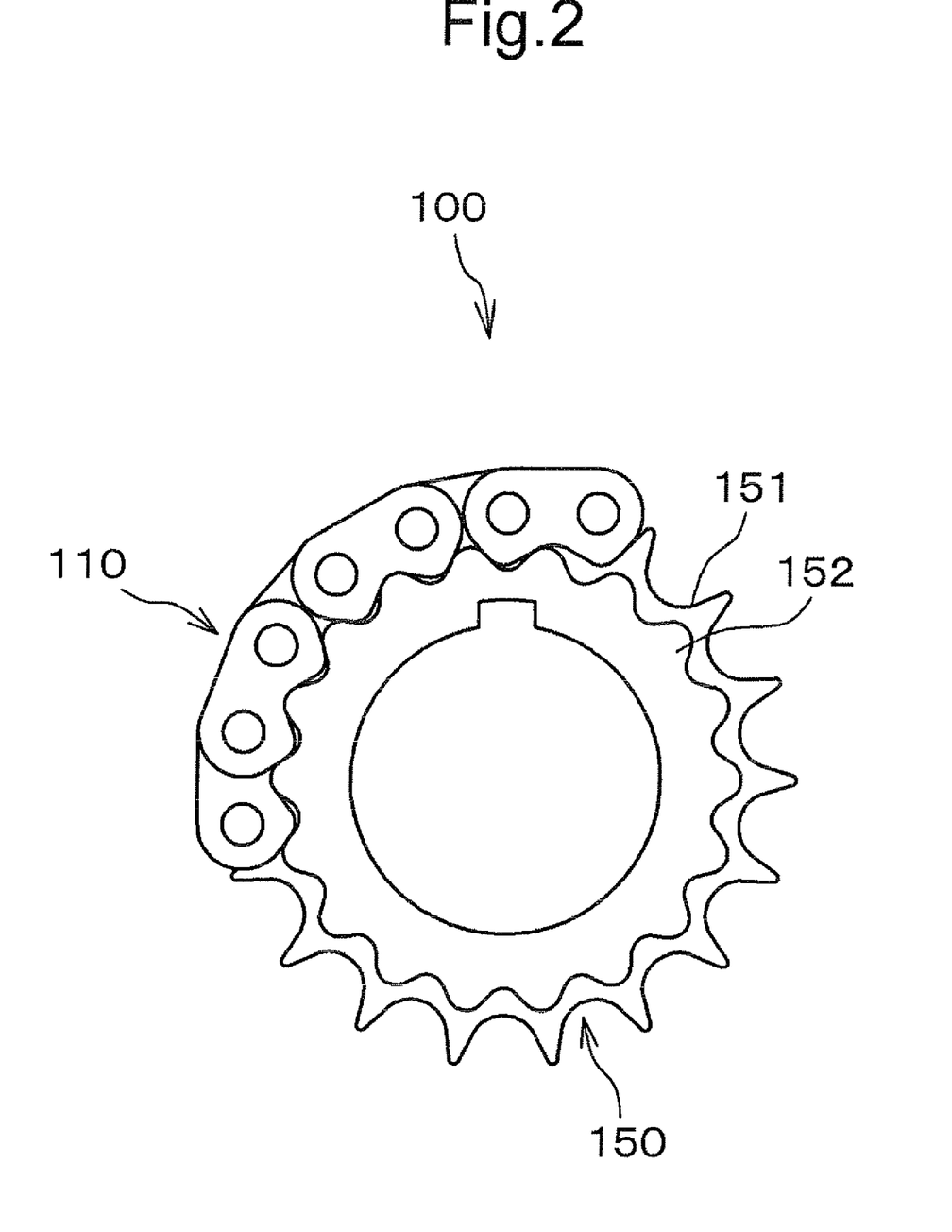
FIG. 2 is a side elevational view of the transmission part shown in FIG. 1.

The chain transmission according to the invention can be used to drive a valve-operating camshaft in an engine, or the shaft of an auxiliary engine component such as an oil pump or the like, and can also be used to transmit motive power, and for power transmission in other mechanisms such as a transfer system. As shown in FIGS. 1 and 2, in the chain transmission according to the invention, a chain 110 is wrapped around a sprocket 150 to transmit driving force from the chain to the sprocket, or from the sprocket to the chain.

Figure 3:
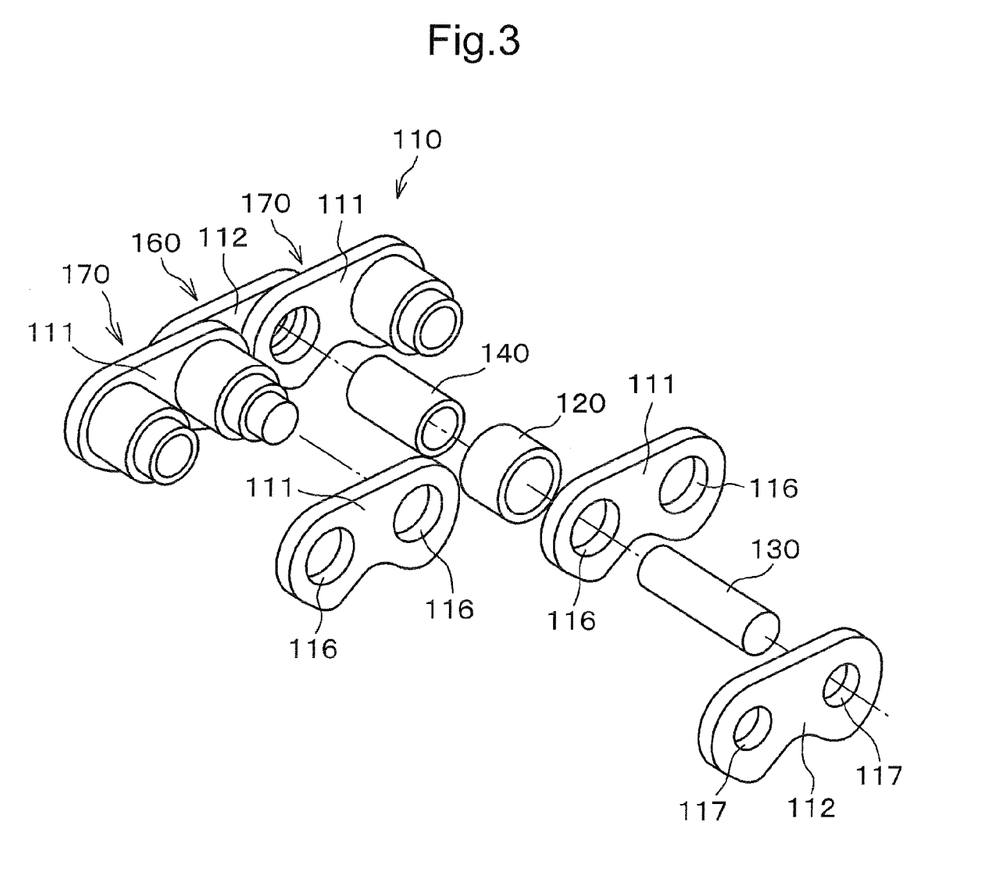
FIG. 3 is an exploded perspective view of a part of the chain.

As shown in FIG. 3, the chain comprises an outer link 160, in which the ends a pair of connecting pins 130 are secured in pin holes 117 in a pair of outer link plates 112, and an inner link 170, in which bushings 140 are respectively secured in respective front and rear bushing holes 116 of a pair of inner link plates 111. The inner and outer links are alternately connected to one another by loosely fitting the connecting pins 130 into the bushings 140. In the case of a roller chain, rollers 120 are provided on the bushings, and are rotatable on the bushings.

Figure 4:
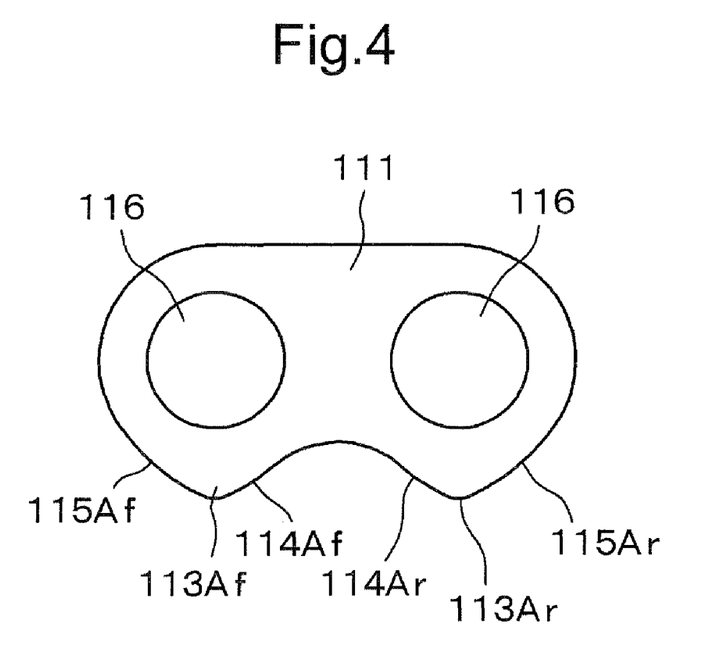
FIG. 4 is a side elevational view of an inner link plate of the chain.

As shown in FIG. 4, the inner link plate 111 has front and rear bushing holes 116, and front and rear link plate teeth 113Af and 113Ar, respectively, under the front and rear bushing holes 116. The front link plate tooth 113Af has an inner flank 114Af and an outer flank 115Af, and the rear link plate tooth has an inner flank 114Ar and an outer flank 115Ar.

Figure 5:
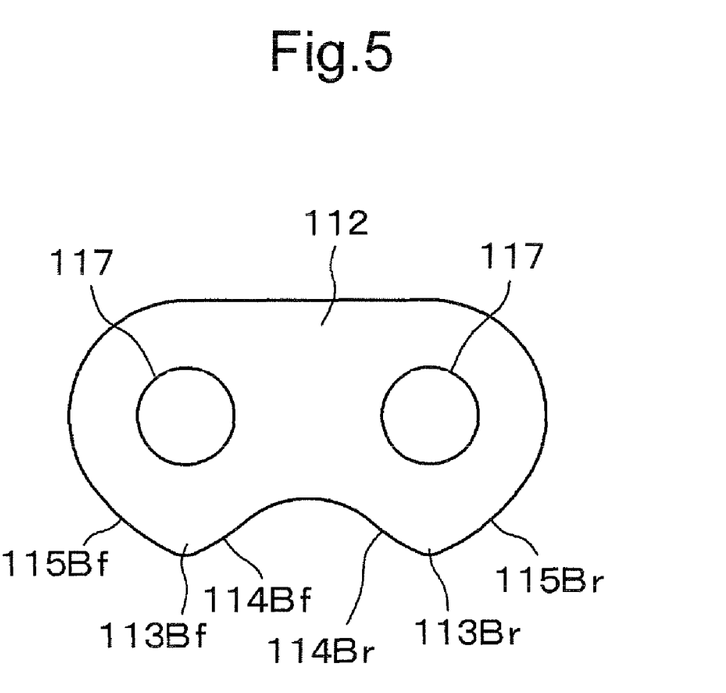
FIG. 5 is a side elevational view of an outer link plate of the chain.

As shown in FIG. 5, the outer link plate 112 has front and rear pin holes 117, and front and rear link plate teeth 113Bf and 113Br, respectively, under the front and rear pin holes 117. The front link plate tooth 113Bf has an inner flank 114Bf and an outer flank 115Bf, and the rear link plate tooth has an inner flank 114Br and an outer flank 115Br.

The inner flanks 114Af and 114Ar have a shape that is slightly different from the shape of inner flanks 114Bf and 114Br. On the other hand, the outer flanks 115Af, 115Ar, 115Bf and 115Br are all formed in the same shape.

Figure 6:
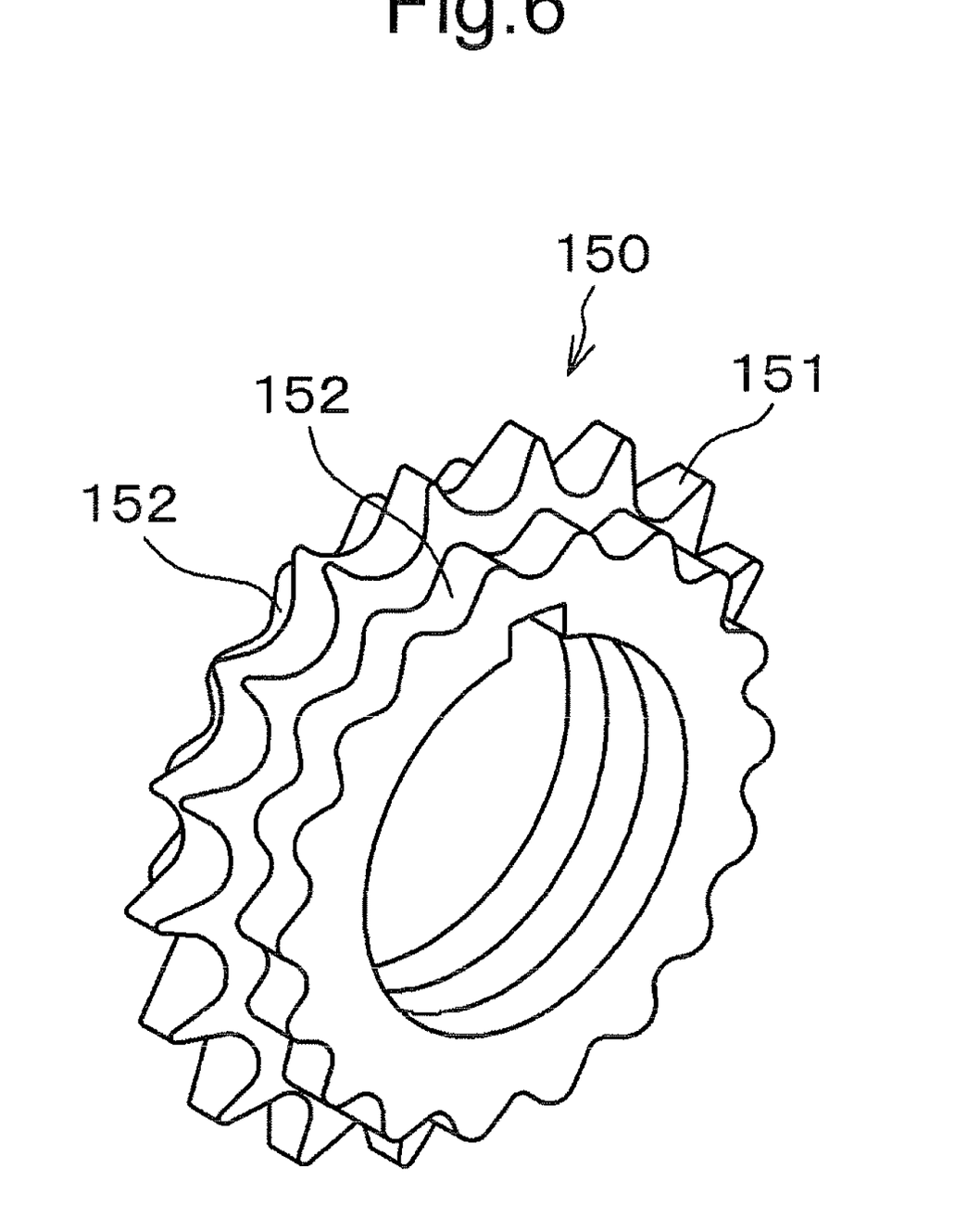
FIG. 6 is a perspective view of the sprocket of the chain transmission.
Figure 7:
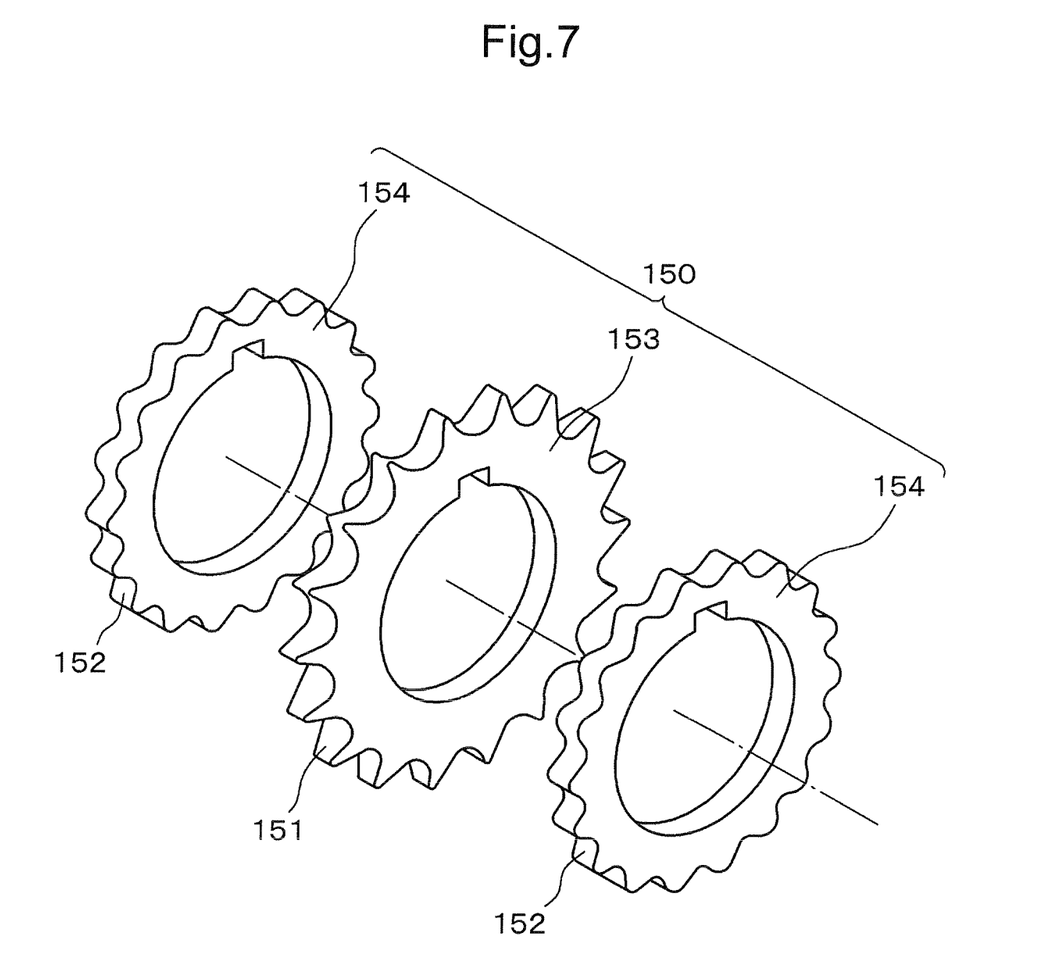
FIG. 7 is an exploded perspective view of the sprocket of FIG. 6.

As shown in FIGS. 6 and 7, the sprocket 150 is composed of a central sprocket 153 having sprocket teeth 151, side sprockets 154, each having side sprocket teeth 152. The teeth 151 of the central sprocket engage with rollers 120 of the chain 110, and the teeth 152 of the side sprocket engage with link plate teeth 113Af, 113Ar, 113Bf and 113Br of the chain. The side sprockets 154 are provided on both sides of the central sprockets 153 and the side sprockets are integrally fixed to the central sprocket so that all three sprockets rotate together. Although, as shown in FIG. 7, the sprocket 150 consists of three components, it is possible to form the sprocket 150 as a unitary member, on which the central sprocket teeth 151 and the side sprocket teeth 152 are formed.

The shapes of the link plate teeth 113Af, 113Ar, 113Bf and 113Br, the central sprocket teeth 151, and the side sprocket teeth 152, are formed such that, when the chain 110 is wound around the sprocket 150, the inner flanks 114Af and 114BF of the forward link plate teeth 113Af and 113Bf first come into contact with side sprocket teeth 152. Then the front roller 120 of the link whose front inner flanks came into contact with the side sprocket teeth comes into contact with a central sprocket tooth 151. Then, as the rear roller of the link is seated on a tooth gap bottom of the central sprocket, the outer flank 115Af or 115Bf of a front link plate tooth 113Af or 113Bf, and the outer flank 115Ar or 115Br of a rear link plate tooth 113Ar or 113Br come into contact with side sprocket teeth 152.

The shapes of the link plate teeth 113Af, 113Ar, 113Bf and 113Br, the sprocket teeth 151, and the side sprocket teeth 152 are also formed such that, when the chain 110 is disengaged from the sprocket 150, an inner flank 114Ar or 114Br on a rear tooth engages a side sprocket tooth, ensuring smooth disengagement of the adjacent roller from the tooth gap on which it was seated.

The central sprocket tooth 151 can be standard tooth forms, and the link plate teeth 113 and the side sprocket teeth 152 are shaped so that the above-described movements take place.

The operation of the chain transmission 100 will be described with reference to FIGS. 8 to 13, which depict sequential steps as the sprocket 150 rotates counterclockwise. The sprocket is shown in a fixed position, and the figures show sequential steps in the bending of the chain.

The term "forward" is used herein with reference to the direction of advancing movement of the chain. In FIGS. 8 to 13, link plates are designated L1, L2 and L3, plate L1 being forward of link plate L2, and plate L2 being forward of plate L3. Rollers are similarly designated a roller R1, R2 and R3, Roller R1 being forward of roller R2 and roller R2 being forward of Roller R3.

The forward link plate teeth of the link plates L1, L2 and L3 are designated H1f, H2f and H3f, respectively, and the rearward teeth are designated H1r, H2r and H3r, respectively. The outer flanks of the forward teeth are designated G1f, G2f, and G3f, and the inner flanks of the forward teeth are designated U1f, U2f, and U3f. The outer flanks of the rearward teeth are designated G1r, G2r and G3r, and the inner flanks of the rearward teeth are designated U1r, U2r, and U3r.

Figure 8:
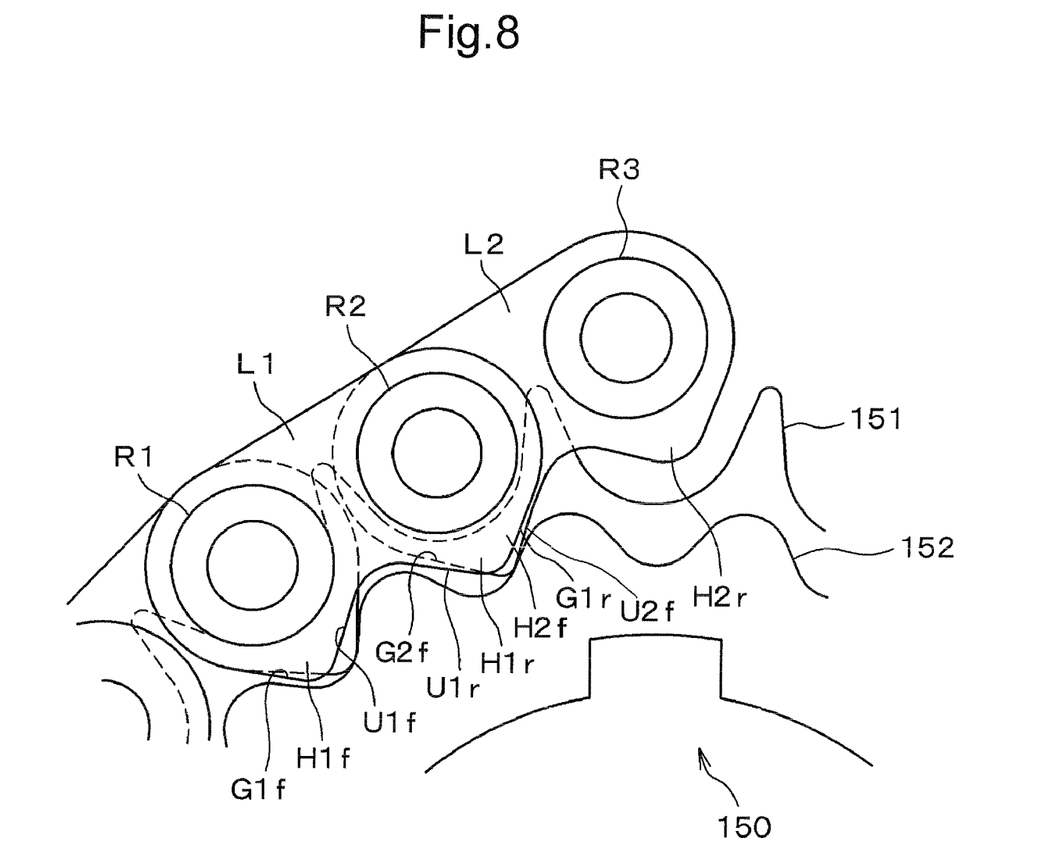
FIGS. 8-13 are schematic views showing the operation of the chain transmission.

The sequence of engagement will be described beginning at a stage, depicted in FIG. 8, in which a roller R1 is seated on the central sprocket. As the chain advances, link plate L1 is bent about roller R1, and roller R2 and link plate tooth H1r approach the sprocket 150. At the same time, a link plate tooth H2f of a link plate L2 also approaches the sprocket, and its inner flank U2f comes into contact with a side sprocket tooth 152 before the roller R2 and the link plate tooth H1r contact the sprocket.

The inner flank U2f and the side sprocket tooth 152 come into sliding contact, as in the case of a conventional silent chain. Consequently, only a small engagement noise is produced as the inner flank U2f contacts the sprocket tooth.

Figure 9:
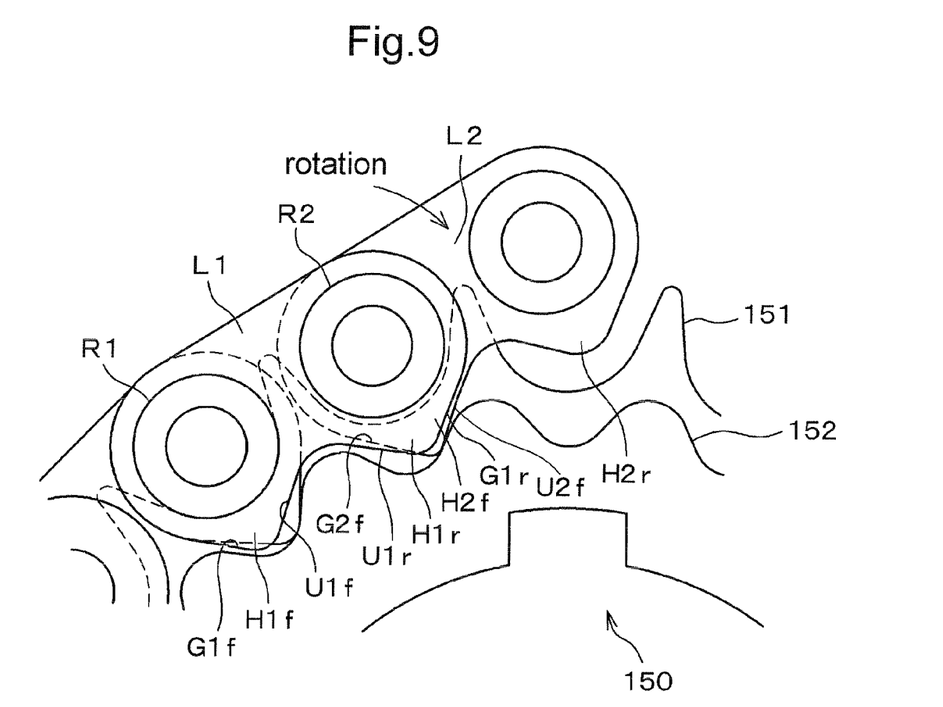

As the chain continues to advance, the inner flank U2f of link plate L2 starts bending while sliding on a tooth 152 of the side sprocket as shown in FIG. 9, and the roller R2 gradually approaches a sprocket tooth 151.

Figure 10:
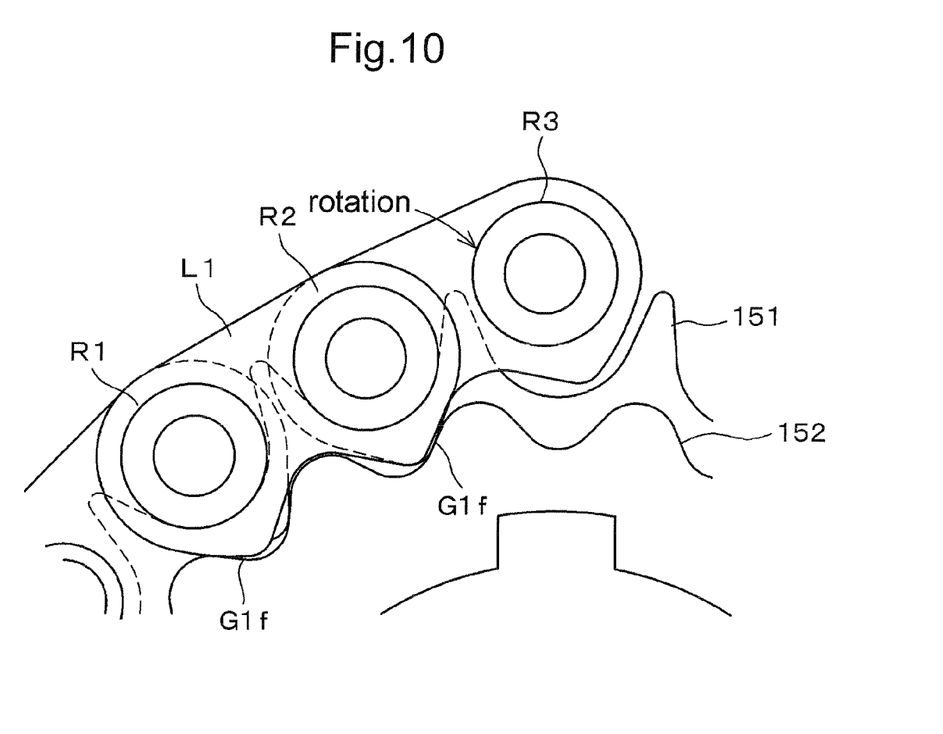

As shown in FIG. 10, winding of the link plate L1 onto the sprocket 150 is completed by the contact of the roller R2 with the sprocket teeth 151.

Since the contact of the roller R2 with the sprocket teeth 151 takes place gradually while the inner flank U2f of the link plate L2 is restricted by sliding on the surface of a side sprocket tooth 152, the noise generated by contact of the roller with the central sprocket teeth is much less than the noise generated by conventional roller chain.

The shapes of the link plates and the positions of the rollers are such that, when both rollers R1 and R2 are seated on the sprocket teeth 151, both outer flanks G1f and G1r of the link plate L1 come into contact with side sprocket teeth 152. Because the link plate L1 comes into contact with the side sprocket teeth 152 at two points on its outer flanks G1f and G1r, vibration and noise are reduced to a greater degree than in the case of a transmission using a conventional roller chain.

Figure 11:
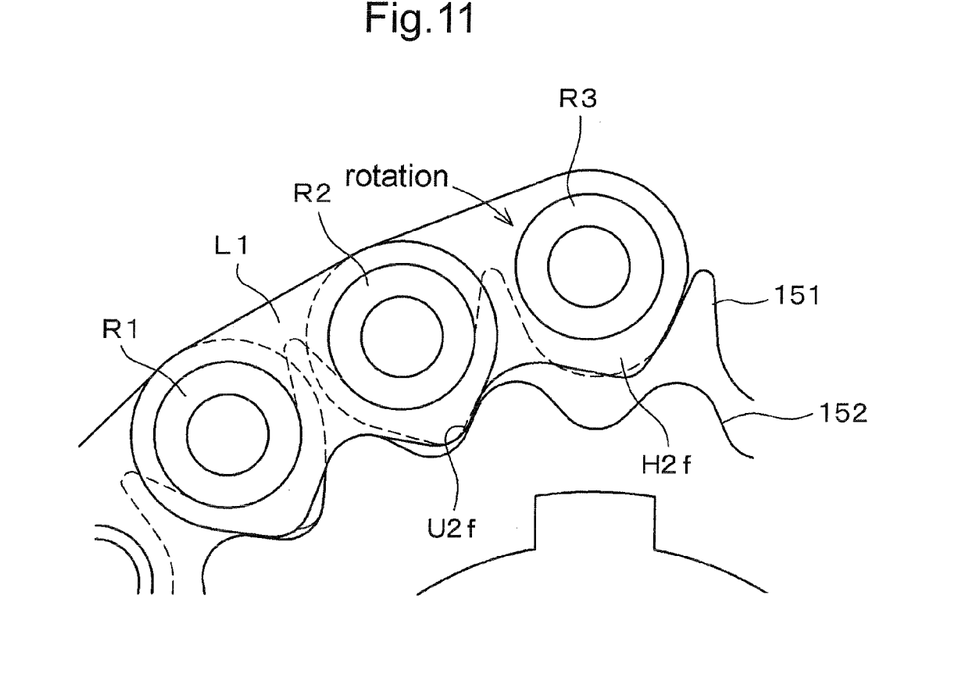
Figure 12:
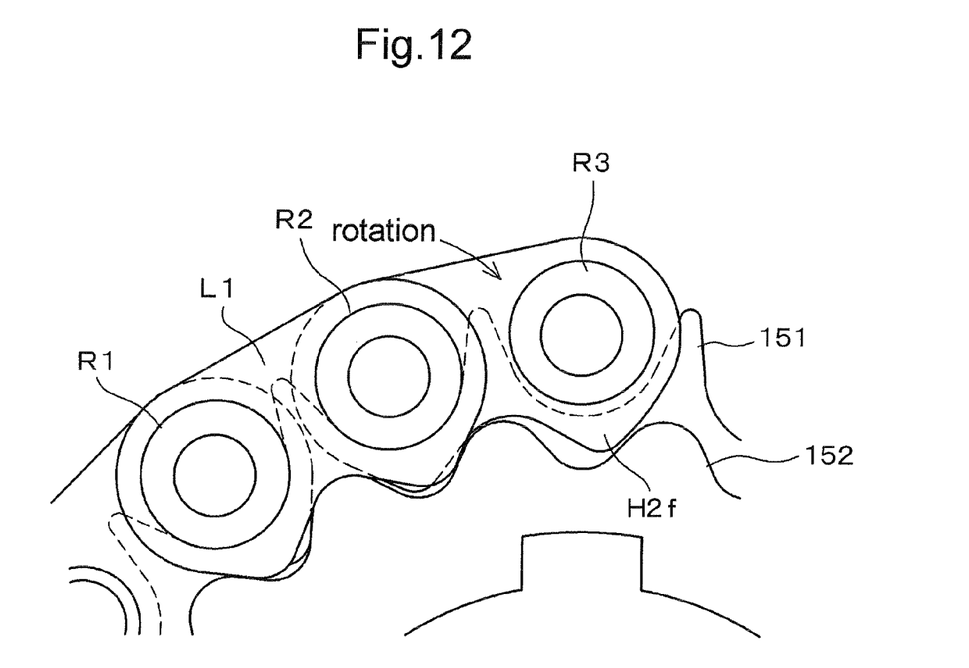

After the seating of the rollers R1 and R2, as shown in FIG. 11, the following link plate L2 starts bending about the roller R2, and its inner flank U2f is disengaged from a tooth surface of a side sprocket tooth 152. As shown in FIG. 12, a link plate tooth H2r of the link plate L2 and a roller R3 rapidly approach the sprocket.

Figure 13:
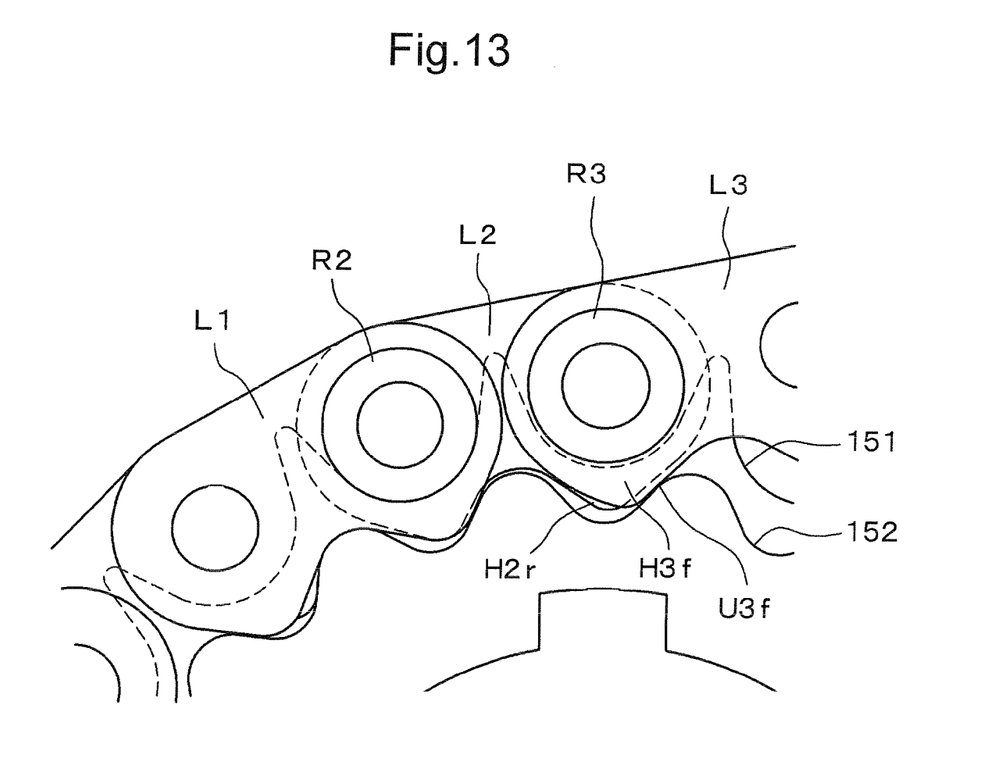

When the chain continues to advance as shown in FIG. 13, the link plate L2 continues to bend about roller R2, and the roller R3 and the rear tooth H2r of link plate L2 approach the sprocket 150. However, at the same time, a forward link plate tooth H3f of a link plate L3 also approaches the sprocket 150, and the inner flank U3f of the link plate L3 comes into contact with a sprocket tooth 152 before the roller R3 and the link plate tooth H2r contact the sprocket. As a result, the transmission goes through a complete cycle, returning to the condition shown in FIG. 8, with chain advanced by a distance corresponding to the chain pitch.

As the chain moves around the sprocket, above-described sequence is repeated. As mentioned previously with reference to FIGS. 4 and 5, the inner flanks 114Af and 114Ar on the inner link plates 111 have a shape different from that of inner flanks 114Bf and 114Br on the outer link plate 112. Thus, in FIGS. 8-13, the inner flanks U1f and U1r have a shape different from that of inner flanks U2f and U2r. As a result the timing when the link plate first comes into contact with the link plate is changed in every cycle. Therefore, vibration, and noise, at frequencies corresponding to the number of the sprocket teeth, are reduced.

When the chain is disengaged from the sprocket, the operation is the reverse to the above-described operation. That is the steps advance from FIG. 13 to FIG. 8, with the sprocket rotating clockwise. As the engagement proceeds from the condition shown in FIG. 11 to the condition shown in FIG. 10, link plate L2 rotates counterclockwise as roller R3 moves out of the tooth gap in which it was seated, and its inner flank U2f comes into contact with a surface of a side sprocket tooth 152. As in the case of engagement, in disengagement of the chain from the sprocket, the timing is also changed every cycle, and vibration and noise, at frequencies which correspond to the number of sprocket teeth are reduced.

The outer flanks 115Af, 115Ar, 115Bf and 115Br may have shapes such that they do not come into contact with the side sprocket teeth 152 at all. Alternatively, the shapes may be such that the rollers 120 do not come into contact with the central sprocket teeth 151, and power transmission is performed by the link plate teeth 113 and the side sprocket teeth 152 as in a conventional silent chain.

The shapes of the outer flanks 115Af, 115Ar, 115Bf and 115Br can also be such that the outer flanks first come into contact with the sprocket as the link plates of the chain approach the sprocket. In that case, the outer flanks 115Af and 115Ar can be formed so that they have a shape different from that of outer flanks 115Bf and 115Br.

Figure 14:
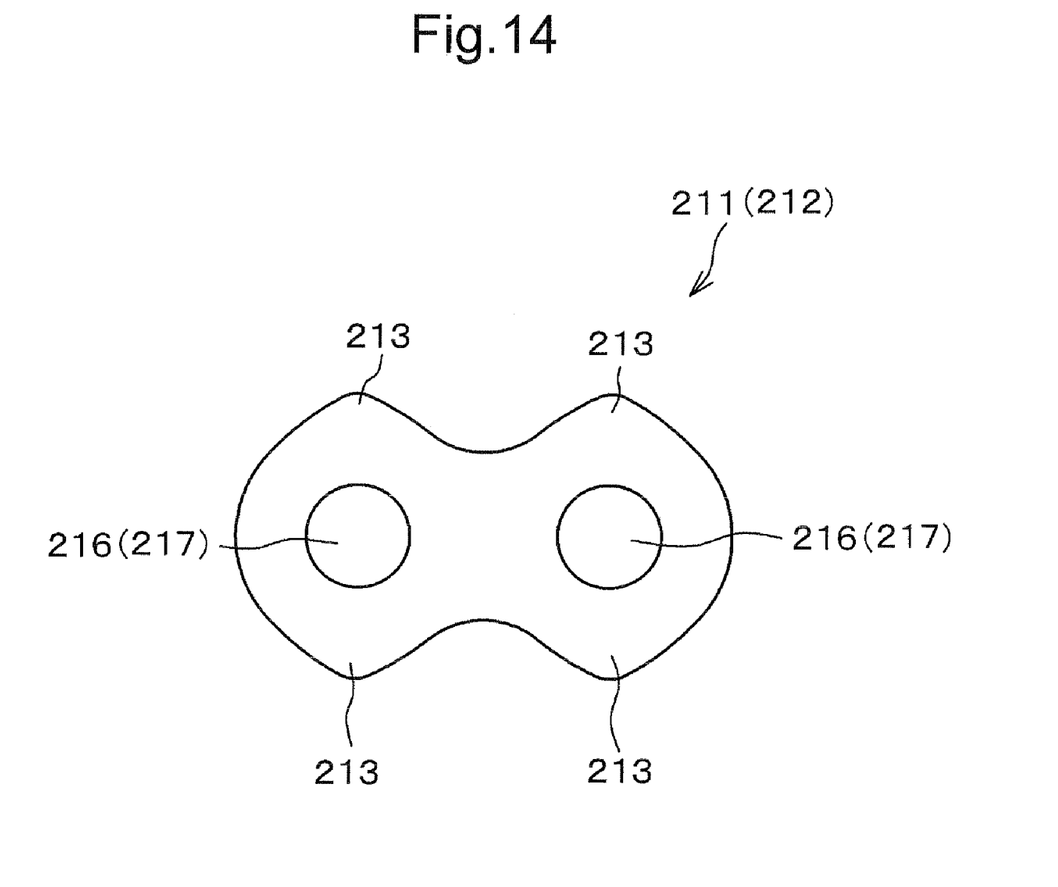
FIG. 14 is a side view of a link plate in a chain transmission according to an alternative embodiment of the invention.

As shown in FIG. 14, if link teeth 213 are provided on both the upper and lower sides of the inner and outer link plates 211 and 212, assembly of the chain becomes easier, with no necessity to set the link plate 211 and 212 in a particular direction during assembly, as in the case of a conventional silent chain. In addition, when link plates corresponding to those shown in FIG. 14 are used, the chain can be used in a transmission in which the chain meshes with sprockets on the exterior of the loop formed by the chain as well as with sprockets on the interior of the loop.

Various modifications can be made to the chain. For example, the outer links and the inner links of the chain include additional link plates, with or without teeth. Moreover, it is possible for some of these additional link plates to have teeth while others have no teeth.

As mentioned previously, in the sprocket, the central sprocket teeth and side sprocket teeth can be formed on a unitary member, or a central sprocket and side sprockets can be fastened together. As a further alternative, a central sprocket and side sprockets can be fixed to a common shaft without a direct connection between the side sprockets and the central sprocket.

Additionally, in the chain transmission of the invention, it is possible for some of the sprockets to have side sprocket teeth while others have no side sprocket teeth.

Finally, it is possible for some or all of the link plates to be formed so that the inner flank of the front link plate tooth of each said link plate has a shape different from that of the inner flank of the rear link plate tooth of the same link plate. When the inner flanks of the same link plate have different shapes, the timing of disengagement of the link plate teeth from the side sprocket teeth is shifted, and a further reduction in vibration and noise, at frequencies which correspond to the number of sprocket teeth, can be realized.

We claim:

1. A chain transmission comprising a chain and a sprocket in mesh with the chain, said sprocket having an axis of rotation;
   the chain comprising outer links and inner links in alternating, overlapping relationship;
   each outer link comprising a pair of outer link plates in laterally spaced relationship, the outer link plates of each pair being connected by a pair of connecting pins secured respectively in front and rear pin holes in said pair of outer link plates;
   each inner link comprising a pair of inner link plates in laterally spaced relationship, the inner link plates of each pair being connected by a pair of bushings secured respectively in front and rear bushing holes in said pair of inner link plates;
   each connecting pin of each outer link extending through and being rotatable in a bushing of an overlapping inner link;
   in which each of said outer link plates and each of said inner link plates is formed with front and rear link plate teeth;
   in which said sprocket has central sprocket teeth which engage with said bushings or with rollers rotatable on said bushings said central sprocket teeth having tooth gap bottoms and tips;
   in which said sprocket also has side sprocket teeth which engage with said link plate teeth, said side sprocket teeth also having tooth gap bottoms and tips;
   in which the teeth of said outer link plates have a shape different from that of the teeth of said inner link plates;
   in which the tooth gap bottoms of the central sprocket teeth are farther than the tooth gap bottoms of the side sprocket teeth from said axis, and the tips of the central sprocket teeth are also farther than the tips of the side sprocket teeth from said axis;
   in which outer flanks of each outer link plate are shaped to seat on two side sprocket teeth after an inner flank of a forward tooth of a next succeeding inner link plate engages and slides on the rear one of said two side sprocket teeth; and
   in which the roller or bushing on the rear connecting pin of the last-mentioned outer link plate is also positioned to seat on a root of the teeth of the central sprocket after the inner flank of a forward tooth of said next succeeding inner link plate engages and slides on the rear one of said two side sprocket teeth.

2. A chain transmission according to claim 1, in which each of the teeth of said link plates has inner and outer flanks, in which the outer flanks of the teeth of the inner and outer link pates have the same shape, and in which the inner flanks of the teeth of the outer link plates have a shape different from that of the inner flanks of the teeth of the inner link plates.

3. A chain transmission according to claim 2, in which the inner flank of the front link plate tooth of each said link plate has a shape different from that of the inner flank of the rear link plate tooth of the same link plate.

4. A chain transmission according to claim 3, in which side sprocket teeth are provided on both sides of said central sprocket teeth.

5. A chain transmission according to claim 2, in which side sprocket teeth are provided on both sides of said central sprocket teeth.

6. A chain transmission according to claim 1, in which each of the teeth of said link plates has inner and outer flanks, and in which the inner flank of the front link plate tooth of each said link plate has a shape different from that of the inner flank of the rear link plate tooth of the same link plate.

7. A chain transmission according to claim 1, in which side sprocket teeth are provided on both sides of said central sprocket teeth.

8. A chain transmission according to claim 1, in which said link plate teeth are provided on both upper and lower sides of said outer and inner link plates.

* * * * *